US008080078B2

(12) United States Patent
Zbiral et al.

(10) Patent No.: US 8,080,078 B2
(45) Date of Patent: Dec. 20, 2011

(54) ANTI-SNOW MODULE AND AIR FILTER INCLUDING SAME

(75) Inventors: Robert Zbiral, Marbach (DE); Herbert Schenk, Benningen (DE); Dagmar Ruder, Möglingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 291 days.

(21) Appl. No.: 12/332,644

(22) Filed: Dec. 11, 2008

(65) Prior Publication Data

US 2009/0151307 A1 Jun. 18, 2009

(30) Foreign Application Priority Data

Dec. 14, 2007 (DE) .................... 20 2007 017 610 U

(51) Int. Cl.
*B01D 50/00* (2006.01)

(52) U.S. Cl. ...................... 55/385.3; 55/420; 123/198 E

(58) Field of Classification Search .................... 55/306, 55/385.3, 467, 471–473, 490.01, 502, 312, 55/417–422, DIG. 21, DIG. 32; 96/381, 96/384, 397, 399; 60/274, 303, 311; 123/198 E; 454/156, 158
See application file for complete search history.

(56) References Cited

U.S. PATENT DOCUMENTS 4,969,939 A * 11/1990 Machado .................... 55/419
6,079,769 A * 6/2000 Fannin et al. .............. 296/180.1
6,287,355 B1 * 9/2001 Park .............................. 55/419
6,341,585 B1 * 1/2002 Warren ...................... 123/90.15
6,561,320 B2 * 5/2003 Yi ................................. 188/5
6,637,348 B1 * 10/2003 Teichmann et al. ........... 105/453
7,708,792 B2 * 5/2010 Kowalski .................... 55/385.3
7,803,204 B1 * 9/2010 Mladinich ...................... 55/306
2009/0000257 A1 * 1/2009 Krantz ........................ 55/385.3

* cited by examiner

*Primary Examiner* — Duane Smith
*Assistant Examiner* — Minh-Chau Pham
(74) *Attorney, Agent, or Firm* — James Hasselbeck

(57) ABSTRACT

An anti-snow module designed for installation into an air filter housing includes a support plate configured for support in the housing. A partition is provided for mounting into the interior of the housing of the air filter. A valve plate is configured to seals the housing of the air filter below a predetermined differential pressure existing between the interior of the housing of the air filter behind the valve plate and the exterior of the housing of the air filter and open when the differential pressure exceeds a predetermined differential pressure value. At least one guide rail is provided on which the valve plate is slideably supported by at least one guide sleeve provided on the valve plate.

6 Claims, 4 Drawing Sheets

ANTI-SNOW MODULE AND AIR FILTER INCLUDING SAME

TECHNICAL FIELD

The invention relates to an air filter, and more particularly to an air filter for the engine of a motor vehicle.

BACKGROUND OF THE INVENTION

Intake systems of motor vehicles supply "raw" (unfiltered) air from the exterior of the vehicle to the internal combustion engine; this is the primary intake. For cleaning the unfiltered air an air filter is provided in the intake system. The unfiltered air may contain snow under certain climatic conditions. The snow can collect in the intake system, particularly in the air filter or on the air filter element and can cause increased pressure loss or clogging of the intake system. Other pollutants can also cause flow reduction in the intake air system.

Intake systems for motor vehicles in areas with snowfall therefore often have a device with which, instead of unfiltered air being drawn directly from the exterior of the vehicle, unfiltered air is instead supplied from the area of the engine compartment of the internal combustion engine. This is the so-called secondary intake. Collection of snow in the intake system can be realized, for example, by providing a snow screen or grid at a defined location. As a result of intake from the engine compartment, unfiltered air that is already preheated by the engine heat is supplied to the internal combustion engine and the preheated unfiltered air can advantageously thaw snow that is already collected in the intake system or in the air filter, for example, on the snow screen, or on the air filter element. The thawed snow can then be removed as water through a drain outlet in the intake system.

There are various known solutions for switching between combustion air intake from the engine compartment and from the exterior of the vehicle as well as various known solutions for the configuration of a corresponding air filter.

For example, EP 0 624 726 discloses a solution in which the unfiltered air is guided from the exterior of the vehicle through a pipe into the air filter. The pipe ends with a snow screen in the air filter housing. A flap that closes by weight or by spring force extends from the engine compartment to the unfiltered side of the air filter into the air filter housing. When snow collects on the snow screen, the differential pressure between unfiltered side of the air filter and ambient pressure increases until the flap is urged to open against force applied by a spring or weight force and preheated air from the engine compartment then reaches the unfiltered side of the air filter. By means of this preheated air, the snow on the screen will melt so that the intake passage extending to the exterior of the vehicle is freed. This type of flap may also be used to provide air intake when other types of clogging of the intake passage occurs. Flap systems are also disclosed in U.S. 2006/0168920 and DE 87 15 030.

EP 1 645 748 and DE 44 08 097 disclose intake systems in which the passage from the engine compartment to the unfiltered side of the air filter is simply designed fluidically such that at least a small amount of unfiltered air is continually drawn from the engine compartment.

U.S. Pat. No. 6,395,048 and EP 0 494 870 disclose an intake system in which the driver of the motor vehicle can manually switch between intake from the engine compartment or from the exterior of the motor vehicle.

SUMMARY OF THE INVENTION

The invention relates to an anti-snow module for an air filter that is to be installed in the housing of the air filter, particularly of a motor vehicle. The invention further relates to an air filter for a motor vehicle into which an anti-snow module can be inserted. The invention also relates to an air filter for a motor vehicle including an anti-snow module.

It is an object of the present invention to provide a system that can be integrated easily into an intake system for switching engine intake air between air unfiltered air intake from the engine compartment and from the air drawn from the exterior of the vehicle. In particular, it is an object of the present invention to provide a system with which air filters with switching option and without switching option can be realized inexpensively for use of a motor vehicle type in different climatic zones.

According to one aspect of the present invention an anti-snow module for installation in a housing of an air filter, in particular of a motor vehicle, includes a support plate for support on the housing of the air filter; a partition for mounting in the interior of the housing of the air filter; a valve plate for sealing the housing of the air filter below a predetermined differential pressure existing between the interior of the housing of the air filter behind the valve plate and the exterior of the housing of the air filter and for opening the housing of the air filter above a predetermined differential pressure existing between the interior of the housing of the air filter behind the valve plate and the exterior of the housing of the air filter; and at least one guide rail on which the valve plate is slidably supported by means of at least one guide sleeve.

In another aspect of the present invention an air filter for a motor vehicle includes a housing. The housing further includes a first inlet for primary intake of unfiltered air; a second inlet for secondary intake of unfiltered air; guides on the housing of the air filter that enable the insertion of an anti-snow module for closing the second inlet as a function of the differential pressure existing between the interior of the housing of the air filter downstream of the second inlet and the exterior of the housing of the air filter upstream of the second inlet, and, alternatively, the insertion of a sealing plate instead of the anti-snow module for sealing off the second inlet.

In another aspect of the present invention an air filter for a motor vehicle has a housing with a first inlet for primary intake of unfiltered air; a second inlet for secondary intake of unfiltered air; an anti-snow module including a valve plate for sealing the housing of the air filter below a predetermined differential pressure existing between the interior of the housing of the air filter at the second inlet and the exterior of the housing of the air filter and for opening the housing of the air filter above a predetermined differential pressure existing between the interior of the housing of the air filter at the second inlet and the exterior of the housing of the air filter, and at least one guide rail on which the valve plate is slidably supported by means of at least one guide sleeve, thus providing a special configuration of the closure of the inlet for secondary intake.

An anti-snow module for an air filter in accordance with the present invention permits the anti-snow module to be preassembled outside of the air filter housing. The sealing location can be positioned between valve plate and support plate. One or several guide rails can connect the support plate and the partition.

By use of one or more springs that are mounted on one or more guide rails, the differential pressure at which the valve plate opens can be preset. As an alternative to metal springs. It is conceived that the springs may be realized by elastic plastic elements.

When it is designed to be preassembled by means of plug connections, the anti-snow module can be manufactured especially economically. When the individual components of the anti-snow module are insertable (plug connection) such that in the preassembled state the valve plate is forced against the support plate and the support plate and the partition are connected with another, the module can be installed without requiring further adjustments at the mounted air filter, for example, an adjustment of the spring tension.

In one embodiment, the assembled anti-snow module has no weld connection or adhesive connection between support plate, guide rails and partition. This facilitates an inexpensive and quick assembly.

An air filter for a motor vehicle in which a housing includes a first inlet for primary intake of unfiltered air and with a second inlet for secondary intake of unfiltered air is provided in accordance with the present invention with guides on the housing of the air filter. These guides can be, for example, embodied as a guide with an L-shaped angle member or a U-shaped member. An anti-snow module for closing the second inlet as a function of the differential pressure existing between the interior of the housing of the air filter downstream of the second inlet and the exterior of the housing of the air filter upstream of the second inlet can be inserted into the guides. Alternatively, a sealing plate in place of the anti-snow module can be inserted and can seal off the second inlet. In this way, the air filter housing or a part of the air filter housing can be produced by means of an injection mold and can be used for variants with anti-snow system and without anti-snow system.

The guides are preferably designed such that the anti-snow module or the sealing plate are inserted into or pushed into the guides. Additionally the module may be glued or welded into the air filter housing.

When the guides are designed such that the anti-snow module inserted into the guides is fixed satisfactorily, adhesive connections or weld connections between the anti-snow module and housing of the air filter are not needed. This facilitates an inexpensive and simple mounting of the anti-snow system in the air filter housing. But even in case of an adhesive connection or a weld connection being provided after the insertion, the pre-positioning facilitates further assembly steps.

The invention also concerns an air filter for a motor vehicle with a housing and a first inlet for primary intake of unfiltered air and a second inlet for secondary intake of unfiltered air with a special anti-snow device. The anti-snow device comprises a valve plate for sealing the housing of the air filter below a predetermined differential pressure between the interior of the housing of the air filter at the second inlet and the exterior of the housing of the air filter. The valve plate opens above a predetermined differential pressure between the interior of the housing of the air filter at the second inlet and the exterior of the housing of the air filter. The valve plate is slidably supported on one or more guide rails by means of at least one guide sleeve. In this way, the sliding action on the guide rails in connection with springs used for this purpose allow for an especially easy adjustability of the opening.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
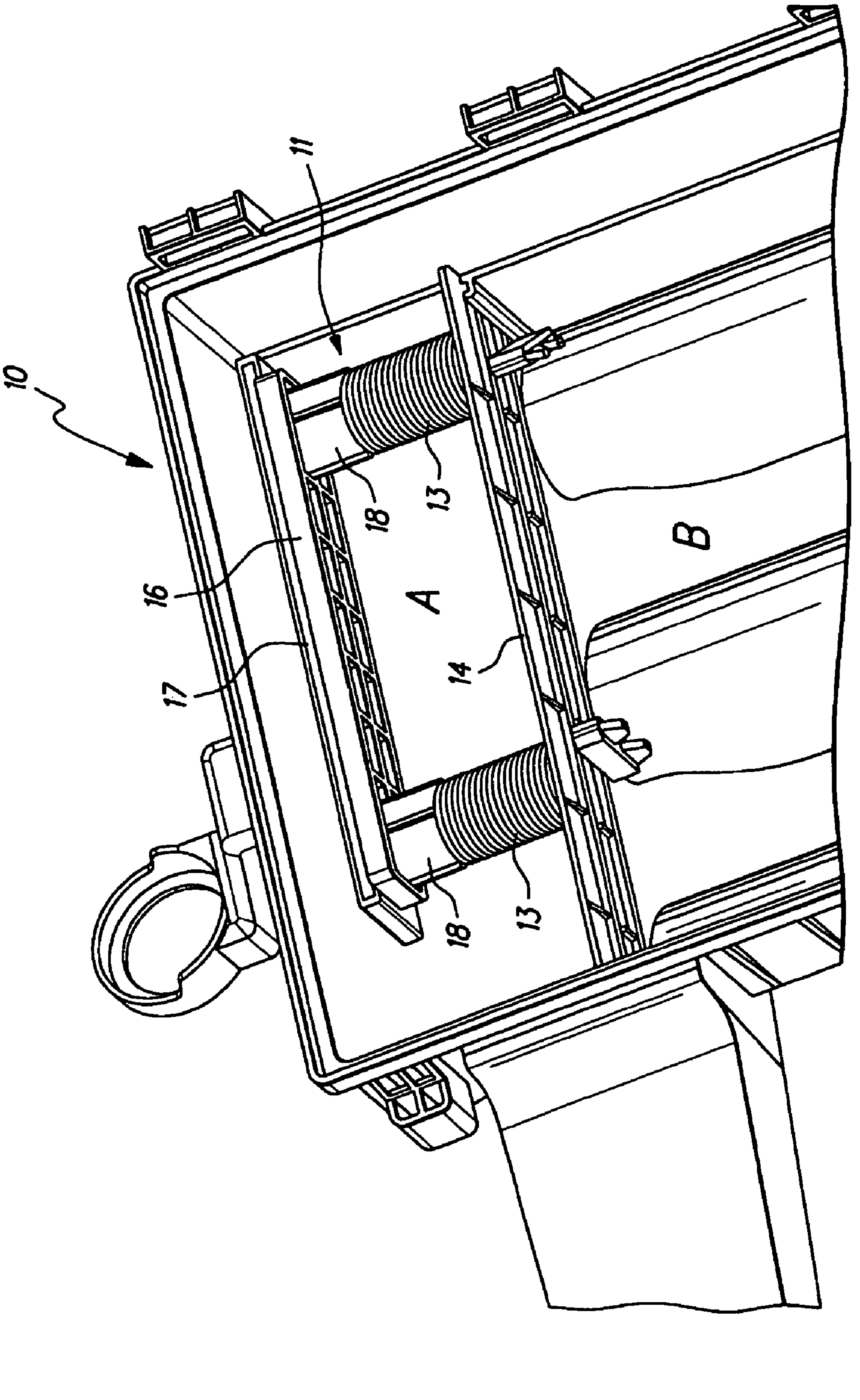
FIG. 1 shows a detail of the geodetically lower part of the air filter housing with the anti-snow module, consistent with the present invention.

FIG. 1 shows a detail of a geodetically lower part of an air filter housing 10. In the air filter housing 10 an anti-snow module 11 is installed. The anti-snow module 11 includes a partition 14 that divides the lower part of the air filter housing 10 into two areas: A and B. The partition 14, in a modification of this embodiment of the invention, can also be provided with openings that fluidically connect the two areas A and B with one another. Two guide rails 19 are inserted into the partition 14 and are connected to a support plate 15 or are integrally formed with the support plate 15. Springs 13 and a valve plate 16 with guide sleeves 18 are pushed onto the guide rails 19. The springs 13 force the valve plate 16 against the support plate 15. The valve plate 16 seals in the closed state by means of seals 17 relative to support plate 15.

In the operating state in the absence of contamination or clogging of the primary intake from the exterior of the motor vehicle, the anti-snow module 11 is closed and the valve plate 16 is urged by the springs 13 against the support plate 15 so that no or only a minimal quantity of air flows from the engine compartment into the air filter housing. When the pressure differential in the primary intake increases, the valve plate 16 is pushed or urged open by means of the ambient pressure against the force of the springs 13 and is moved on the guide rails 19 into the air filter 10. In this way, the secondary intake is opened and air flows from the motor compartment into the air filter 10.

The air filter element is inserted into the geodetically lower part of air filter housing 10 so that it is arranged in the upper area inter alia on the partition 14. The anti-snow module 11 separates therefore by means of the partition 14 the space below the air filter element into the areas A and B. In the operating state in the absence of clogging or flow reduction of the primary intake, air flows substantially through area B of the filter element. Upon opening of the valve plate 16 the air filter element also receives air flow through area A.

The anti-snow module 11 can be preassembled and inserted as an assembly into the air filter housing 10. Mounting can be realized simply by insertion. In the embodiment of FIG. 1 the anti-snow module with the partition 14 is inserted into guides on the air filter housing 11 and by means of support plate 15 inserted into further guides on the air filter housing 11. The insertion can be realized with or without locking action, specifically in the embodiment of FIG. 1 the anti-snow module 11 is simply inserted. When needed, the anti-snow module 11 can also be welded or glued to the air filter housing 10. Since the anti-snow module 11 divides only the unfiltered side of the air filter 10 into different areas A and B and seals it from the environment, a sealing action relative to the exterior or on the partition 14 is usually not needed.

Figure 2A:
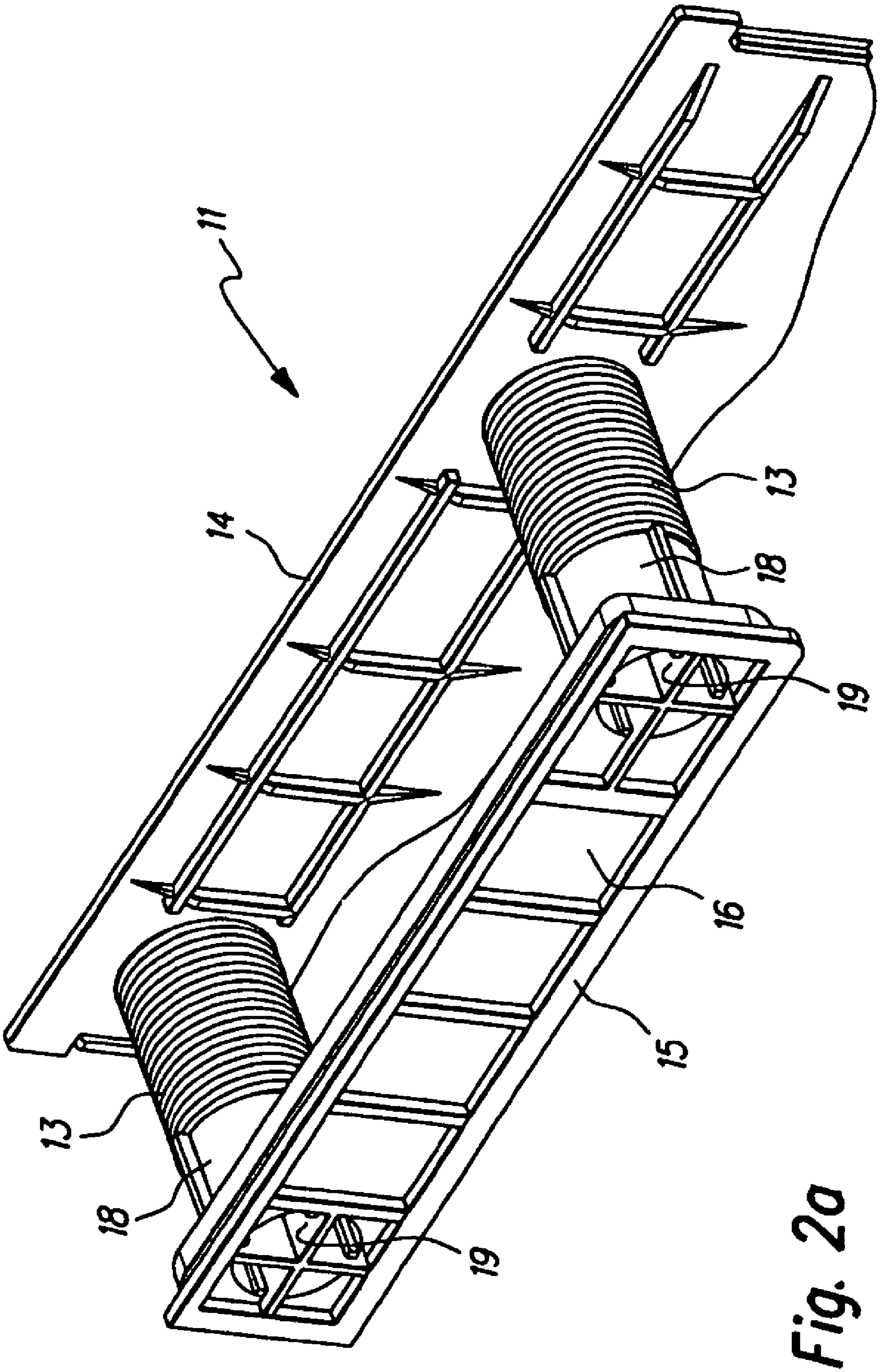
FIG. 2*a* is a perspective view of the anti-snow module, consistent with the present invention.

FIG. 2*a* shows a preassembled anti-snow module with support plate 15 with passages. The valve plate 16 is pushed with guide sleeves 18 onto guide rails 19 of the support plate 15. Springs 13 press the valve plate 16 against the support plate 15 already in the preassembled state. The guide rails 19 are inserted into the partition 14. The entire anti-snow module 11 can therefore be preassembled and can be produced simply by inserting the individual parts. The preassembled anti-snow module 11 can then be inserted into the air filter housing 10.

Figure 2B:
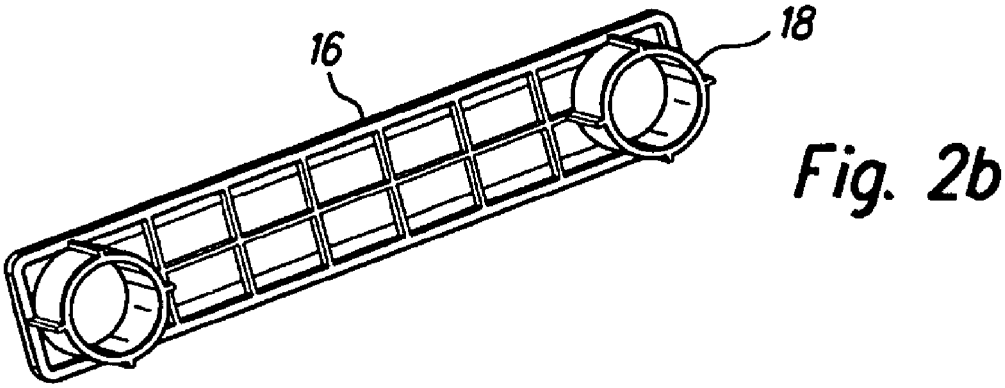
FIG. 2*b* illustrates a first component of the anti-snow module, consistent with the present invention.
Figure 2C:
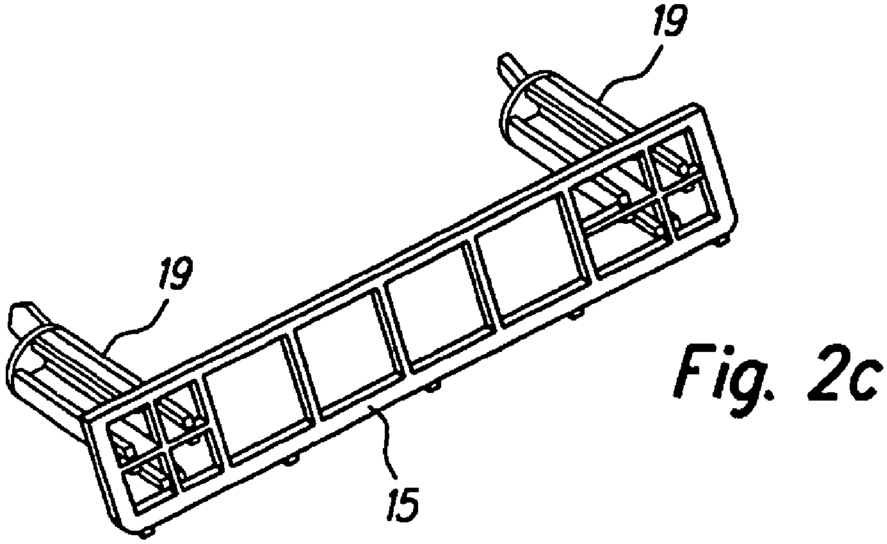
FIG. 2*c* illustrates a second component of the anti-snow module, consistent with the present invention.
Figure 2D:
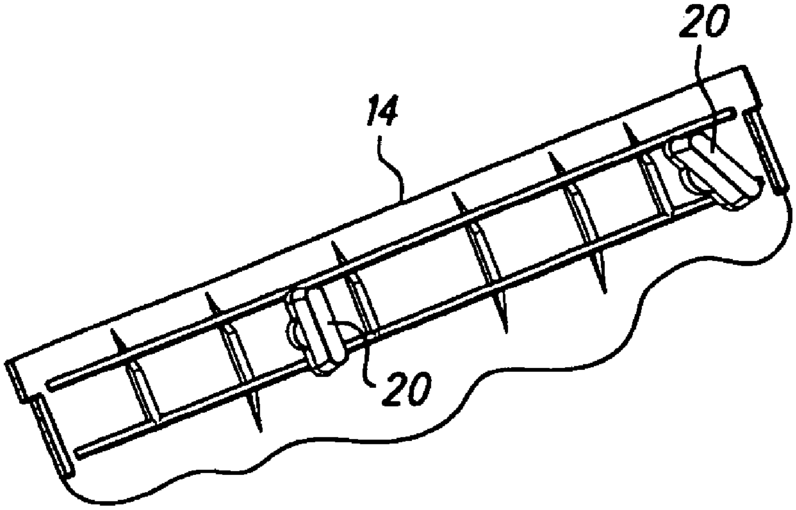
FIG. 2*d* illustrates a third component of the anti-snow module, consistent with the present invention.

FIG. 2*b* shows the valve plate 16 with guide sleeves 18. FIG. 2*c* shows the support plate 15 with guide rails 19. On the valve plate 16 and/or on the support plate 15 seals can be inserted, integrally formed by injection molding, or connected in any other way as would be known to those skilled in the art. FIG. 2*d* shows the partition 14 with insertion devices 20 for insertion of the guide rails 19 of the support plate 15. The valve plate 16, the partition 14, and the support plate 15 are preferably produced by injection molding.

Figure 3:
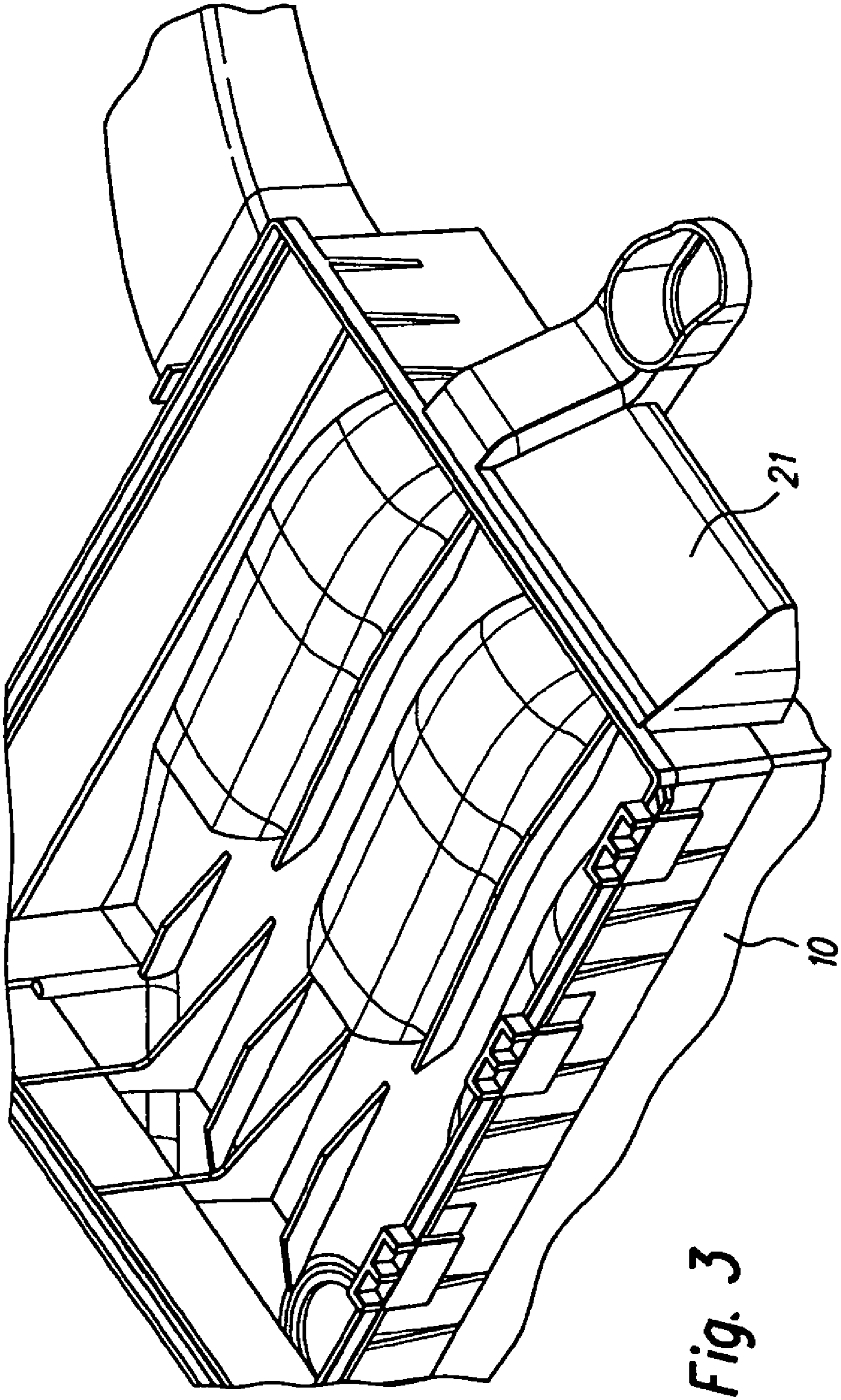
FIG. 3 is a perspective view of a variant of the geodetically lower part of air filter housing.

FIG. 3 shows a detail of the geodetically lower part of the air filter housing 10 in an alternative embodiment relative to FIG. 1. In addition, a protective cover 21 at the entrance of the secondary intake to the engine compartment is provided. By means of the protective cover 21 the opening of the air filter 10 relative to the engine compartment is protected from dirt or debris falling within the engine compartment or from dripping water droplets or condensation within the engine compartment.

By selecting suitable springs 13, the strength of the closure action of the secondary intake and thus the pressure at which the secondary intake is opened can be matched to the specifications of the internal combustion engine. When an opening action is provided by pushing back the valve plate 16 by 2 mm to 20 mm, preferably 5 mm to 10 mm, for a surface area of the valve plate 16 of 20 $cm^2$ to 80 $cm^2$, preferably 30 $cm^2$ to 50 $cm^2$, a sufficient flow rate for operation of the internal combustion engine of the motor vehicle is already provided. Preferably, the valve plate 16 opens at a differential pressure of approximately 50 mbar.

When the air filter 10 is to be used in a vehicle in which clogging or flow reduction of the passage of primary intake is not expected, for example, when the vehicle is used on paved roads in warm climates, then the engine compartment air passages of the air filter 10 can be simply sealed off by a sealing plate and the air filter can be operated without the anti-snow module. The sealing plate is inserted into the guides that can also receive the support plate 15. The air filter element then has available the entire area below the air filter element including spaces A and B. In this way, an adaptable air filter that is inexpensive to manufacture is provided. Only one mold for the injection molding process of the lower part of the air filter housing 10 is required. The guide rails are always integrally formed. The housing of the air filter 10 is then closed off by a sealing plate or the anti-snow module 11 is inserted into the air filter. All components of the anti-snow module 11 illustrated in FIGS. 1 to 3 can be easily removed from an injection mold.

While the best modes for carrying out the invention have been described in detail, those familiar with the art to which this invention relates will recognize various alternative designs and embodiments for practicing the invention within the scope of the appended claims.

The invention claimed is:

1. An anti-snow module for installation in a housing of an air filter, the anti-snow module comprising:

a support plate configured and adapted to support said module in said housing of said air filter;

a partition configured for mounting into an interior of said housing of said air filter;

a valve plate having at least one guide sleeve, said valve plate configured to seal a secondary air inlet of said housing when a differential pressure between said housing interior at a downstream side of said valve plate and an exterior of said housing is below a predetermined value, said valve plate configured to open said secondary air inlet of said housing when said differential pressure exceeds said predetermined value; and at least one guide rail slideably and supportively engaged with said at least one guide sleeve to slideably support said valve plate, wherein said anti-snow module is arranged in said housing at an intake air side of said air filter, wherein said partition divides said intake side into two separated areas- a first and a second area, wherein when said differential pressure is less than said predetermined value, said sealing of said valve plate closes said secondary air inlet preventing secondary air flow from reaching said second area, and wherein when said differential pressure exceeds said predetermined value, said valve plate is urged by said differential pressure to slide via said slideable and supportive engagement of said guide rails in said guide sleeves to open said secondary air inlet allowing air flow to reach said second area of said intake side of said filter.

2. The anti-snow module according to claim 1, further comprising at least one spring received onto said at least one guide rail, wherein said at least one spring is operative to establish said predetermined value at which said valve plate opens.

3. The anti-snow module according to claim 1, wherein said module is configured and adapted to be preassembled by insertion into said housing.

4. The anti-snow module according to claim 3, wherein said anti-snow module is preassembled into said filter housing without the use of a weld seam or adhesive connection between any of said support plate, said at least one guide rail, and said partition.

5. An air filter comprising an anti-snow module according to claim 1.

6. An air filter for a motor vehicle comprising:

a housing with a first inlet for primary intake of unfiltered air;

a second inlet for secondary intake of unfiltered air; and an anti-snow module;

wherein said anti-snow module includes a valve plate configured to seal said second inlet of said housing when a differential pressure between a housing interior at a downstream side of said valve plate and an exterior of said housing is below a predetermined value, said valve plate configured to open said second inlet when said differential pressure exceeds said predetermined value; and wherein said anti-snow module includes at least one guide rail on which said valve plate is slideably supported by at least one guide sleeve provided on said valve plate, wherein said anti-snow module is arranged in said housing at an intake air side of said air filter, wherein said partition divides said intake side of said air filter into two separated areas- a first and a second area, wherein said first inlet is connected to and delivers intake air to said first area, wherein said second inlet is connected to and delivers intake air to said second area through said anti-snow module, wherein when said differential pressure is less than said predetermined value, said sealing of said valve plate prevents air flow from reaching said second area of said intake side of said air filter, and wherein when said differential pressure exceeds said predetermined value, said valve plate is urged by said differential pressure to slide via said slidable and supportive engagement of said guide rails in said guide sleeves to open said secondary air inlet allowing air flow to reach said second area of said intake side of said filter.

* * * * *